(12) United States Patent
Mir et al.

(10) Patent No.: US 7,895,452 B2
(45) Date of Patent: Feb. 22, 2011

(54) TECHNIQUE FOR PROTECTING A DATABASE FROM AN ONGOING THREAT

(75) Inventors: Rahil Abbas Mir, Bangalore (IN);
Preetam Ramakrishna, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 900 days.

(21) Appl. No.: 11/773,688

(22) Filed: Jul. 5, 2007

(65) Prior Publication Data

US 2009/0013194 A1      Jan. 8, 2009

(51) Int. Cl.
*G06F 12/14*  (2006.01)
(52) U.S. Cl. ...................................... 713/193
(58) Field of Classification Search ........................ None
See application file for complete search history.

(56) References Cited

U.S. PATENT DOCUMENTS 7,463,590 B2 *  12/2008  Mualem et al. ............. 370/241

* cited by examiner

*Primary Examiner*—Brandon S Hoffman
(74) *Attorney, Agent, or Firm*—Park, Vaughan, Fleming & Dowler LLP

(57) ABSTRACT

A system for stopping an ongoing threat to a database is described. During operation, if an ongoing threat to the database is detected, the system modifies a threat-assessment condition. Then, the system selectively restricts access to one or more cryptographic keys for the database based on the threat-assessment condition. Next, the system selectively activates decryption of requested encrypted information based on the threat-assessment condition. Note that both the selective restriction of access to the one or more cryptographic keys and the selective activation of decryption can be used to stop the ongoing threat from accessing the encrypted information in the database.

25 Claims, 6 Drawing Sheets

FIG. 6

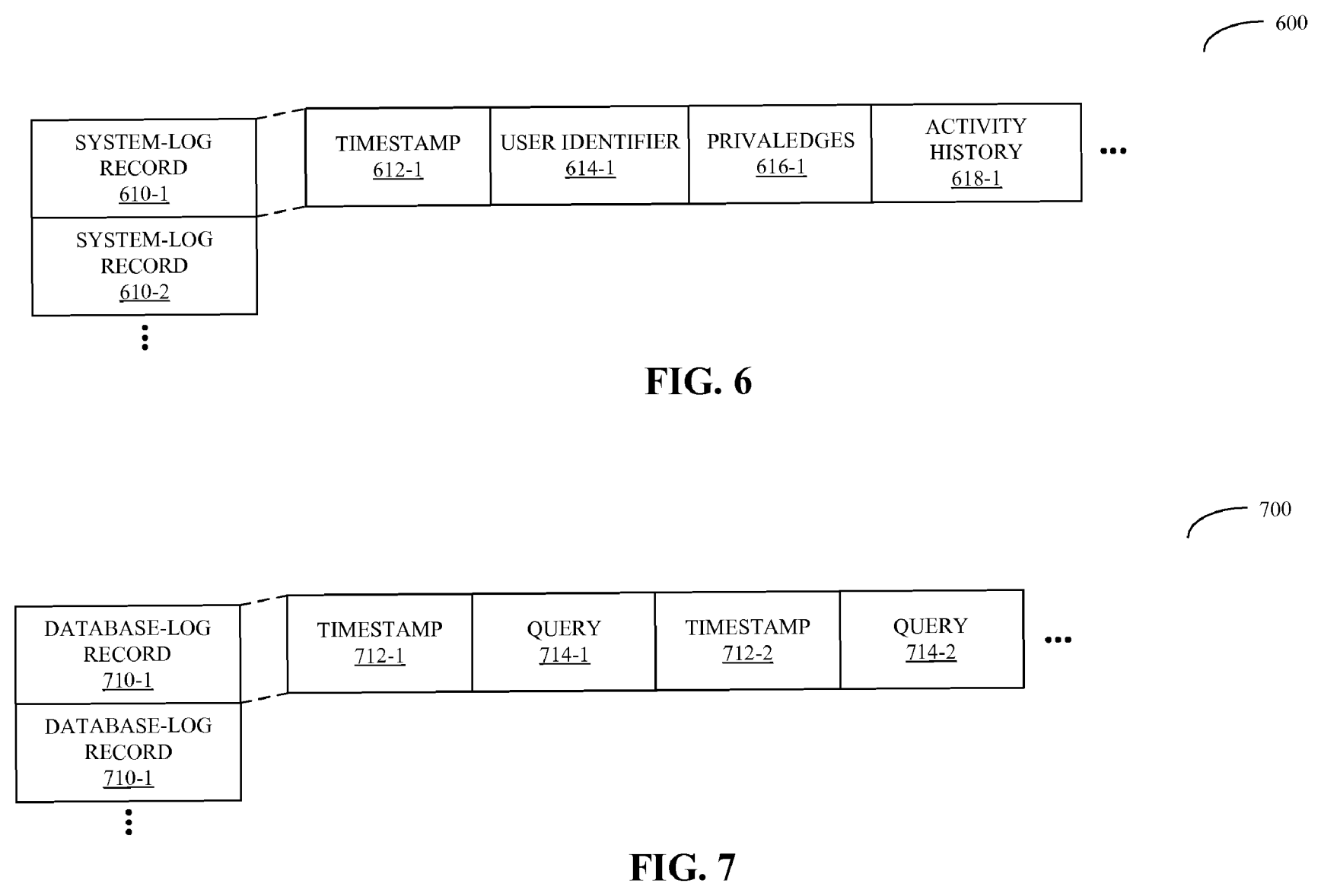

SYSTEM-LOG RECORD 610-1: | TIMESTAMP 612-1 | USER IDENTIFIER 614-1 | PRIVALEDGES 616-1 | ACTIVITY HISTORY 618-1 | ...

SYSTEM-LOG RECORD 610-2

DATABASE-LOG RECORD 710-1: | TIMESTAMP 712-1 | QUERY 714-1 | TIMESTAMP 712-2 | QUERY 714-2 | ...

DATABASE-LOG RECORD 710-1

...

700

TECHNIQUE FOR PROTECTING A DATABASE FROM AN ONGOING THREAT

BACKGROUND

1. Field of the Invention

The present invention relates to techniques for protecting a database from an ongoing threat.

2. Related Art

A number of different of security techniques are presently being used in computer systems to safeguard valuable data. These security techniques include: authentication, access control lists, labeling, auditing, virtual private databases, obfuscation, and encryption.

Unfortunately, these security techniques offer, at best, only limited protection from a live or ongoing database threat or attack. In particular, existing database Intrusion Detection Systems (IDSs) detect attacks (for example, using auditing) and send notifications to database administrators, who can then take the necessary steps to respond to the attack. However, when an attack is detected these systems do not immediately take action to stop the attack. Consequently, the speed of response is slower that it could be, and data security can be compromised as a result of this delay.

Hence, what is needed are techniques that can be used to provide security in databases without the problems listed above.

SUMMARY

One embodiment of this invention provides a system that stops an ongoing threat to a database. During operation, if an ongoing threat to the database is detected, the system modifies a threat-assessment condition. Then, the system selectively restricts access to one or more cryptographic keys for the database based on the threat-assessment condition. Next, the system selectively activates decryption of requested encrypted information based on the threat-assessment condition. Note that both the selective restriction of access to the one or more cryptographic keys and the selective activation of decryption can be used to stop the ongoing threat from accessing the encrypted information in the database.

In some embodiments, the decryption involves: transparent data encryption, a symmetric cryptographic transformation, and/or an asymmetric cryptographic transformation. For example, the decryption may involve public-key/private-key decryption.

In some embodiments, the one or more cryptographic keys are stored separately from the database, thereby providing an external control on access to at least the portion of the information in the database.

In some embodiments, modification of the threat assessment condition occurs within a pre-determined time interval after the ongoing threat is detected, where the pre-determined time interval is associated with a database-access control policy and a query parsing time. For example, the pre-determined time interval may be less than 1-2 seconds.

In some embodiments, the system selectively terminates the processing of queries in the database based on the threat-assessment condition, thereby stopping the ongoing threat from accessing information from the database.

In some embodiments, the system provides an alert to an administrator based on the threat-assessment condition. Moreover, the operations of selective restriction of accesses to keys and selective activation of decryption may occur prior to or concurrently with the providing of the alert.

In some embodiments, the ongoing threat is detected based on: database activity; a user identifier; a pattern of information requests; a time interval during which the information requests are received; an attempt to access privileged information in the database; and/or an attempt to access sensitive information in the database.

In some embodiments, the threat-assessment condition is set to a given value in a group of values, where the given value is based on a severity of the ongoing threat.

In some embodiments, the system selectively disables the one or more cryptographic keys based on the threat-assessment condition. This selective disabling may involve: encrypting the one or more cryptographic keys and/or erasing the one or more cryptographic keys.

In some embodiments, the selective activation of decryption is implemented at least partially within the database.

Another embodiment provides a computer program product for use in conjunction with the computer system. This computer program product may include instructions corresponding to at least some of the above-described operations.

Another embodiment provides a method, which performs at least some of the above-described operations.

BRIEF DESCRIPTION OF THE FIGURES

FIG. 6 is a block diagram illustrating a data structure in accordance with an embodiment of the present invention.

FIG. 7 is a block diagram illustrating a data structure in accordance with an embodiment of the present invention.

Note that like reference numerals refer to corresponding parts throughout the drawings.

DETAILED DESCRIPTION

Figure 1:
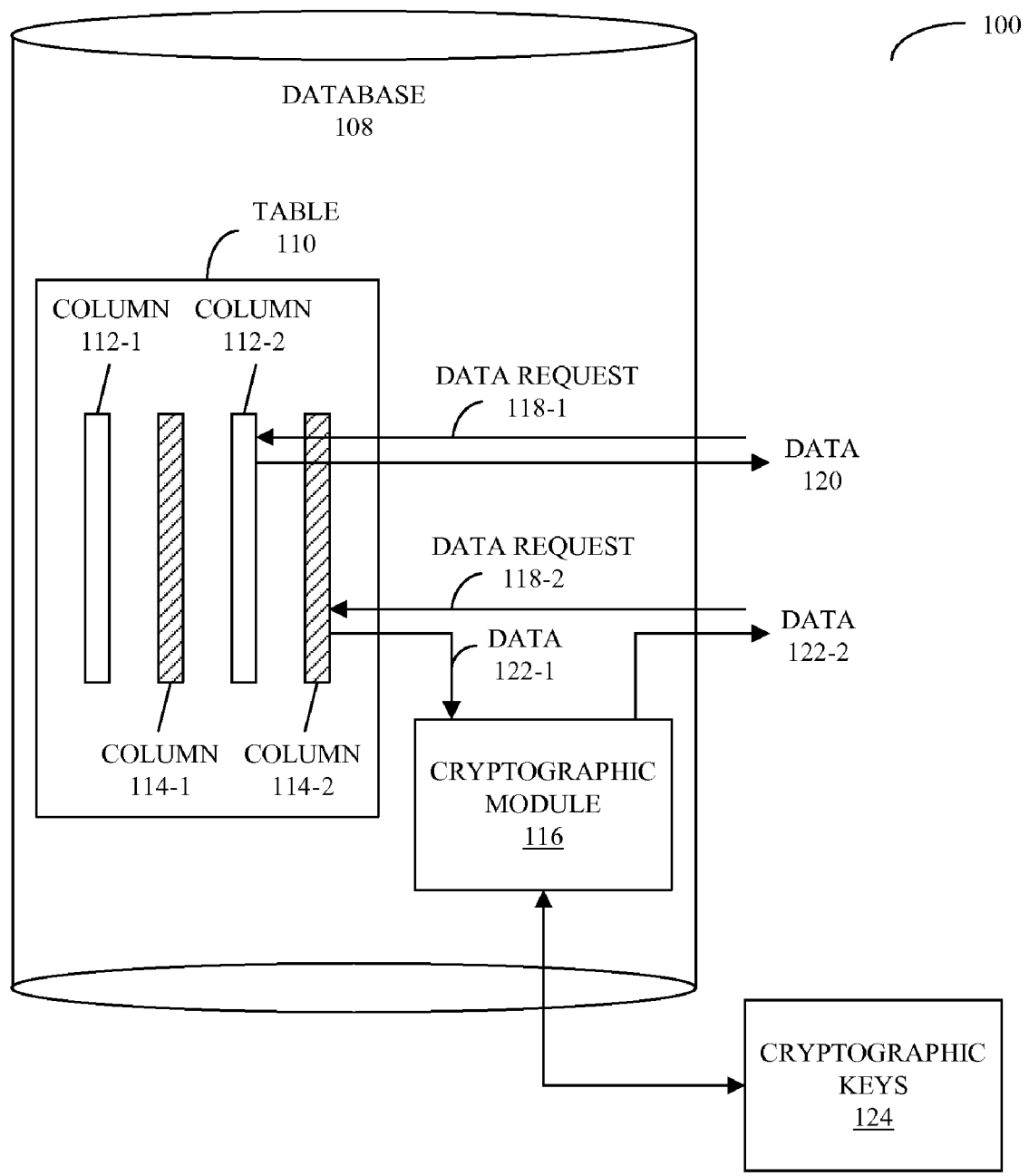
FIG. 1 is a block diagram illustrating a database in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a database, a computer system that includes the database, a method, and a computer program product (i.e., software) for use with the computer system are described. These databases, systems, software, and processes may be used to provide a secure environment in which data is stored. In particular, the database and the computer system may include software and/or hardware that detects and stops ongoing threats or attacks (such as unauthorized access or theft of data) on the database. Moreover, portions of this defensive technique may be included within the database, because the database has direct access to data that facilitates determining when an attack is occurring.

In some embodiments, data to be stored in the database is encrypted and data being read from the database is decrypted. For example, the encryption/decryption may include transparent data encryption (TDE). While a wide variety of cryptographic techniques may be used, in an exemplary embodiment public-key/private-key decryption is used. In some embodiments, one or more cryptographic keys are stored separately (i.e., external to) the database, thereby providing an external control on access to at least the portion of the information in the database.

When an attack on the database is detected, the computer system may modify a threat-assessment condition (in general, the threat-assessment condition is set to one of multiple values based on a severity of an ongoing threat). Based on the threat-assessment condition, access to one or more cryptographic keys is selectively restricted, and decryption of requested encrypted information is selectively activated, thereby stopping the ongoing threat from accessing the encrypted information in the database. In particular, the attack may be stopped rapidly (for example, within 1-2 seconds), which is faster than the response time of an administrator of the computer system.

These techniques may be implemented using software and/or hardware. Moreover, the software may be a stand-alone software application, or may be a program module or subroutine in another application. Furthermore, the program may be configured to execute on a computer (such as a personal computer, a server, or any device capable of manipulating computer readable data) or in a computer system over a network (such as the Internet, Intranet, LAN, WAN, MAN, or combination of networks, or other technology enabling communication between computing systems). Therefore, the one or more cryptographic keys and the software may be stored locally (for example, on a local computer) and/or remotely (for example, on a computer or server that is accessed via a network).

We now describe embodiments of databases and computer systems for stopping an ongoing database attack. FIG. 1 presents a block diagram illustrating an embodiment 100 of a database 108. Within the database 108, table 110 includes unencrypted data in columns 112 and encrypted data in columns 114. Unencrypted data is stored and retrieved directly. For example, data 120 may be provided in response to data request 118-1.

However, encrypted data is processed by cryptographic module 116 using one or more cryptographic keys 124, which are stored separately from the database 108. In some embodiments, the one or more cryptographic keys 124 are stored in a file (which is henceforth referred to as a wallet). Moreover, a system or security administrator may open the wallet using a token (such as a password) before data to be decrypted (and/or encrypted) is processed. In particular, when the wallet is opened one or more column keys (which are associated with the encryption of the data in columns 114) and/or a master key (which may be used to encrypt the column keys) may be extracted.

Thus, once the wallet is opened, when a data request 118-2 is received, encrypted data 122-1 may be decrypted and unencrypted data 122-2 may be provided. For example, the column keys may be decrypted using the master key, and encrypted data in each column (such as encrypted data in column 114-2) may be decrypted using a unique column key. While not shown in FIG. 1, sensitive data that is to be stored in the database 108 may be encrypted using the one or more cryptographic keys 124.

In some embodiments, the wallet is stored in a computer readable memory that also includes the database 108. Moreover, in some embodiments for performance reasons the one or more cryptographic keys 124 are stored in a memory cache once the wallet is opened.

In some embodiments, the decrypting and/or encrypting of data includes: transparent data encryption (TDE), a symmetric cryptographic transformation, and/or an asymmetric cryptographic transformation. For example, the decrypting and/or the encrypting may include public-key/private-key decryption/encryption, where the one or more cryptographic keys 124 include one or more private keys.

As discussed further below, by selectively activating data decryption and storing the necessary cryptographic keys 124 in a separate wallet, computer systems that include the database 108 may be able to actively respond to an ongoing database attack (i.e., an attack that is in progress), thereby securing sensitive information in the database 108 and preventing further damage.

In some embodiments the database 108 includes: fewer or additional components; two or more components are combined into a single component; and/or a position of one or more components may be changed.

Figure 2:
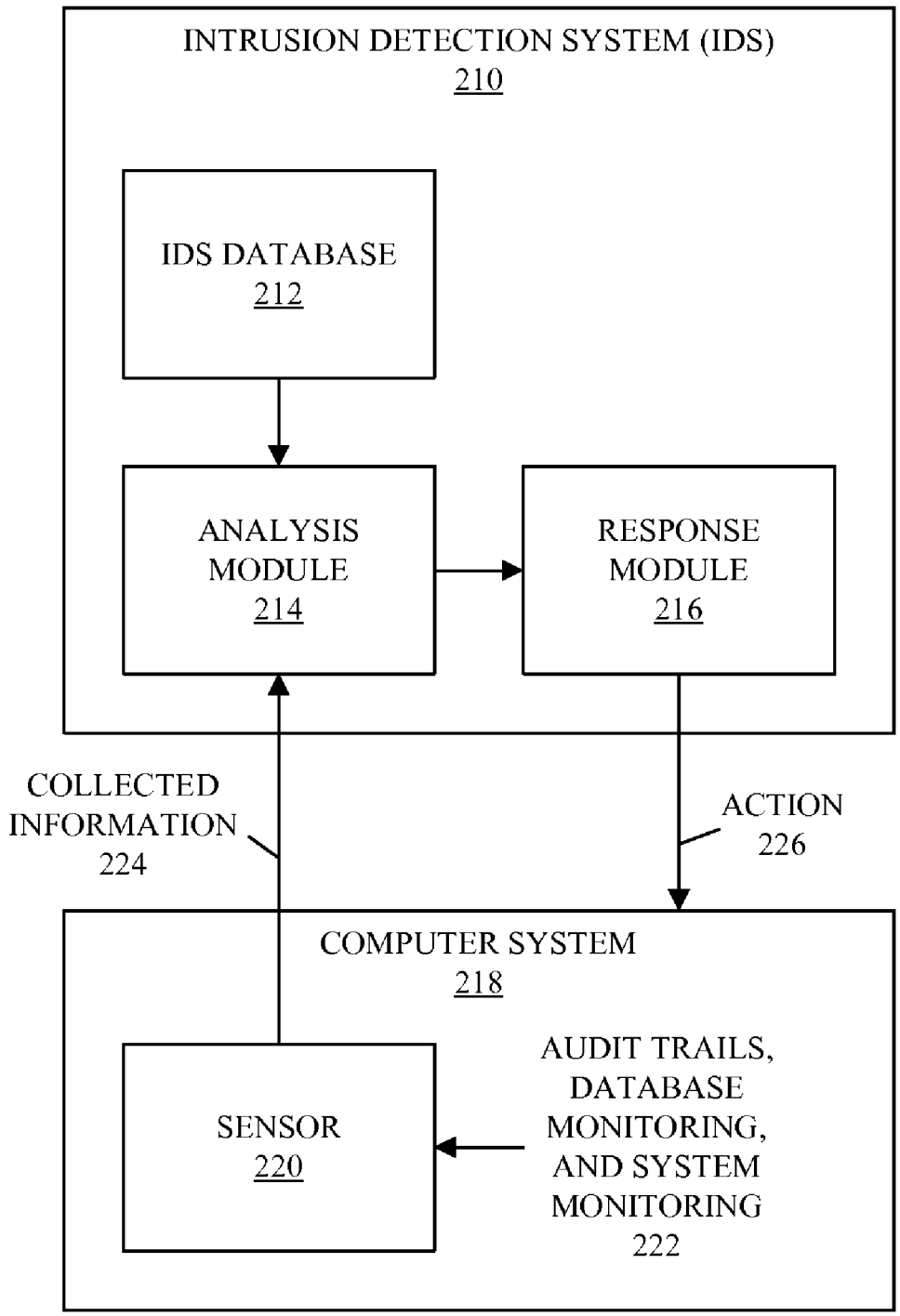
FIG. 2 is a block diagram illustrating a system in accordance with an embodiment of the present invention.

FIG. 2 presents a block diagram illustrating an embodiment of a system 200. This system includes a computer system 218 (which includes a database) and an intrusion detection system (IDS) 210. IDS 210 includes a data collector (such as sensor 220), an analysis module 214, and a response module 216. Note that portions of the IDS 210 (such as the sensor 220) may be included in the computer system 218.

During operation, sensor 220 monitors audit trails 222, database activity and/or system activity. Collected information 224 (such as that associated with one or more events) is forward to analysis module 214, which analyzes the information using data in IDS database 212 (such as potential attack profiles or patterns). As discussed further below with reference to FIG. 3, if an ongoing attack is detected response module 216 takes action 226 (passive and/or active) to protect sensitive information in the database.

In some embodiments the computer system 200 includes: fewer or additional components, two or more components are combined into a single component, and/or a position of one or more components may be changed. Note that IDS 210 may be: a host IDS, a network IDS, and/or an application-specific IDS (such as a database IDS).

Figure 3:
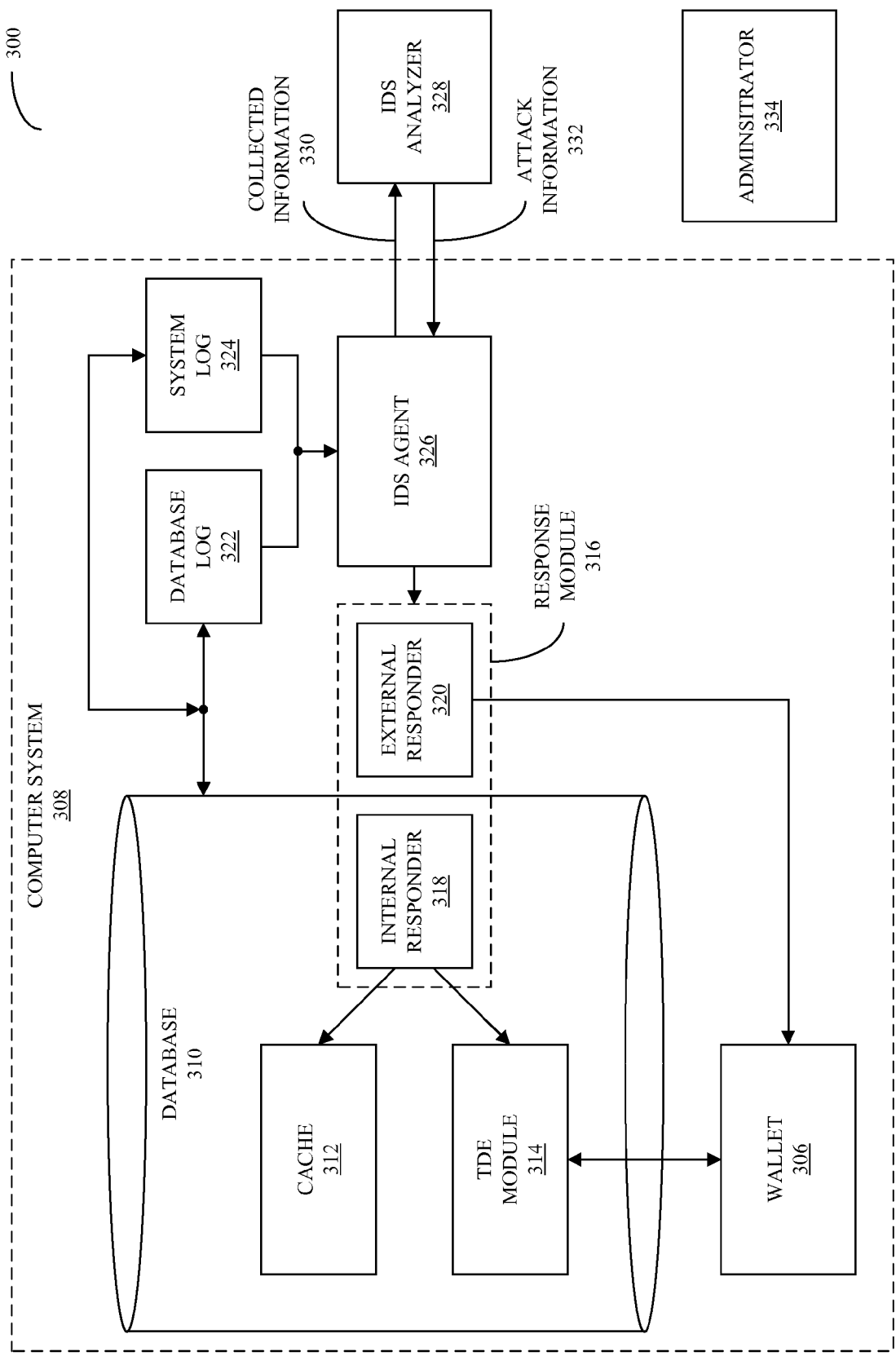
FIG. 3 is a block diagram illustrating a computer system in accordance with an embodiment of the present invention.

FIG. 3 presents a block diagram illustrating an embodiment 300 of a computer system 308. This computer system includes TDE and an IDS to protect sensitive information in a database from an ongoing attack. In particular, database log 322 and/or system log 324 log information about activity in database 310 (such as who is logged in and/or data in audit logs), and IDS agent 326 monitors this information and forwards collected information 330 to IDS analyzer 328. This analyzer determines if an ongoing attack is occurring using techniques such as: anomaly detection, statistical analysis, signature analysis, rule/protocol violations, and/or misuse detection. If an ongoing attack is detected, IDS analyzer 328 modifies a threat-assessment condition using attack information 332.

When the threat-assessment condition is changed, IDS agent 326 instructs response module 316 to take protective action (i.e., there is an active response to an ongoing threat or attack). Note that response module 316 may include an internal response module 318 (which is internal to database 310) and an external response module 320 (which is external to database 310). As discussed further below, either or both of these modules may take protective action, and a particular response depends on the nature of the ongoing attack and the threat-assessment condition.

For example, the external response module 320 may close wallet 306, thereby denying TDE module 314 access to the one or more cryptographic keys and stopping encryption and/or decryption of sensitive data (thus, the external wallet 306 can act as an external switch selectively disabling access to encrypted data in the database 310). Similarly, the internal response module 318 may instruct the TDE module 314 to stop processing requests for encrypted information, and may erase one or more of the cryptographic keys that are temporarily stored in cache 312. While not shown in FIG. 3, in some embodiments the internal response module 318 may also selectively disable all information traffic to and/or from the database 310 (including non-sensitive information) in response to a change in the threat-assessment condition. Note that the combination of the internal response module 318 and the external response module 320 provides defense in depth against an ongoing attack at every level of data access in the database 310.

In some embodiments closing the wallet 306 includes encrypting and/or destroying (such as erasing) at least some of the one or more cryptographic keys (such as the master key). Alternatively, the one or more cryptographic keys may be encrypted using the public key of system or security administrator 334.

Note that once the wallet 306 is closed, administrator 334 will need to reopen the wallet 306 by providing a token before data encryption and/or decryption can resume (even after the ongoing attack or threat has passed). Moreover, if the master key is destroyed, the administrator 334 will also have to provide the master key before data encryption and/or decryption can resume.

Consequently, in some embodiments the administrator 334 is notified by IDS agent 326 (for example, using an alert) when there is a change in the threat-assessment condition and/or when the response module 316 takes action. However, note that response module 316 may take action in the event of an ongoing attack before or concurrently with alerting the administrator 334. In some embodiments the alert includes a message to a security officer (if an intruder is detected) and/or a message based on a preventive measure that was taken against an attack.

Note that alerts sent after a preventive measure is taken may indicate: whether or not the wallet 306 is closed; whether or not at least some of the one or more cryptographic keys have been encrypted; and/or whether or not at least some of the one or more cryptographic keys have been deleted. Moreover, if the wallet 306 is stored on a separate device, the alert may indicate whether or not the connection between the database 310 and the device has been cutoff.

In some embodiments, the modifying of the threat-assessment condition and/or the associated response occurs within a pre-determined time interval after the ongoing attack is detected. For example, the pre-determined time interval may be less than 1-2 seconds. In general, the pre-determined time interval depends on: a database-access control policy, a query parsing time, an IDS detection time, a time to modify the threat-assessment condition, a response time, and/or cleanup time associated with the cache 312.

A wide variety of information and metrics may be used to determine if there is an ongoing attack on the database 310. In some embodiments, the ongoing attack is detected based on: activity in the database 310; a user identifier; a pattern of information requests (such as SQL query patterns); a time interval during which the information requests are received; an attempt to access privileged information in the database 310; and/or an attempt to access sensitive information in the database 310. For example, the presence of an ongoing attack may be determined when a legal user attempts to access legal data at the wrong time (such as a bank teller attempting to access data in the middle of the night). Alternatively, the presence of an ongoing attack may be determined based on how many times certain queries are made. In general, detection is based on IDS policies that are defined, at least in part, by the administrator 334. Note that the detection and response technique described above can detect internal and/or external attacks on the database 310.

In some embodiments, the threat-assessment condition is set to a given value in a group of values, where the given value is based on a severity of the ongoing threat or attack. As discussed previously, based on the threat-assessment condition different types of action may be taken to protect information in the database 310. In an exemplary embodiment, the threat-assessment condition is set to one of six values. In particular:

If there is no ongoing threat or attack, the threat-assessment condition is set to level 0.

If a legal user is attempting to access sensitive information or if a legal user is attempting to access valid information at an add time (for example, a bank teller may be attempting to access data in the middle of the night), the threat-assessment condition may be set to level 1. Based on this threat-assessment condition, the internal response module 318 may close access to the wallet 306.

If the nature of the ongoing threat or attack is similar to that at level 1, but the user has higher privileges in the database 310 (for example, a bank manager who has privileges to modify data may be trying to access data in the middle of the night), the threat-assessment condition may be set to level 2. Based on this threat-assessment condition, the internal response module 318 may close access to the wallet 306 and may erase the one or more cryptographic keys that are temporarily stored in the cache 312. Note that the threat-assessment condition may also be set to level 2 if there is a network breach (as opposed to an attack on the database 310).

If an intruder is sifting between accounts during a short time interval (for example, 0.5-1 hour) and is accessing sensitive information (thereby presenting a pattern in the database log 322 that matches an attack signature), the threat-assessment condition may be set to level 3. Based on this threat-assessment condition, the internal response module 318 may close access to the wallet 306 and may erase the one or more cryptographic keys that are temporarily stored in the cache 312. In addition, the external response module 320 may encrypt the one or more cryptographic keys in the wallet 306 using a cryptographic key associated with the administrator 334.

If the nature of the ongoing threat or attack is similar to that at level 3, but the intruder has also gained sufficient operating system privileges on the disk(s) that the database 310 is hosted on (and thus may now be able to copy the contents of the wallet 306), the threat-assessment condition may be set to level 4. Based on this threat-assessment condition, the internal response module 318 may close access to the wallet 306 and may erase the one or more cryptographic keys that are temporarily stored in the cache 312. In addition, the external response module 320 may destroy the one or more cryptographic keys in the wallet 306.

If highly sensitive information is accessed (such as financial identifiers, personal health information, data that is in a column with a security label, and/or data that is encrypted using 256-bit encryption), the threat-assessment condition may be set to level 5. Based on this threat-assessment condition, the internal response module 318 may close access to the wallet 306 and may erase the one or more cryptographic keys that are temporarily stored in cache 312. In addition, the external response module 320 may destroy the one or more cryptographic keys in the wallet 306 and may disable external access to the database 310.

In some embodiments the computer system 300 includes: fewer or additional components, two or more components are combined into a single component, and/or a position of one or more components may be changed.

Figure 4:
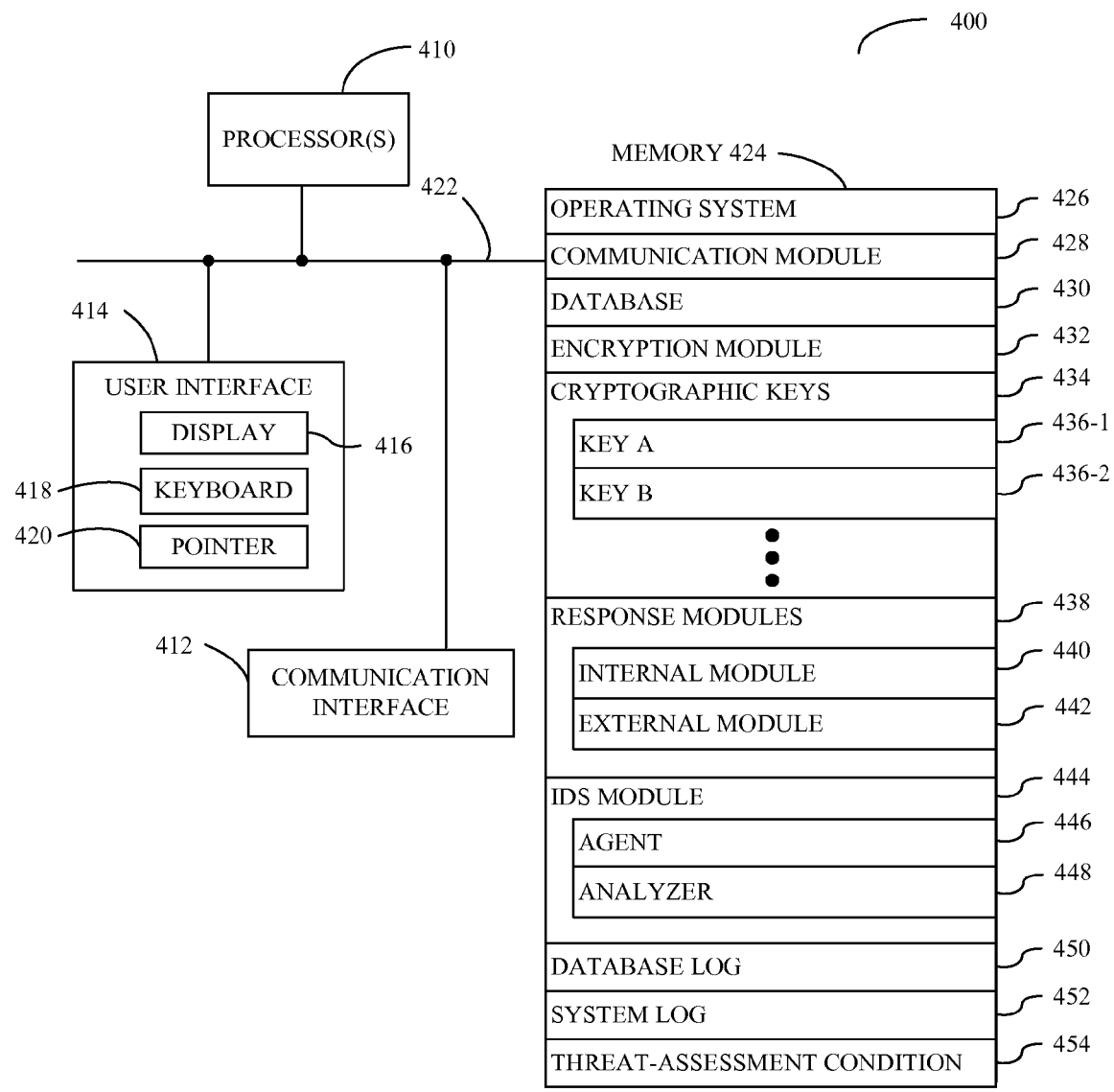
FIG. 4 is a block diagram illustrating a computer system in accordance with an embodiment of the present invention.

FIG. 4 presents a block diagram illustrating an embodiment of a computer system 400. Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. Memory 424 may also store communication procedures (or a set of instructions) in a communication module 428. These communication procedures may be used for communicating with one or more computers and/or servers, including computers and/or servers that are remotely located with respect to the computer system 400.

Memory 424 may include: multiple program modules (or a set of instructions), including encryption module 432 (or a set of instructions), response modules 438 (or one or more sets of instructions), and/or IDS module 444 (or a set of instructions). Note that response modules 438 may include an internal module 440 (or a set of instructions) and an external module (or a set of instructions) 442, and IDS module 444 may include agent 446 and analyzer 448.

Memory 424 may also include: a database 430, cryptographic keys 434, a database log 450, a system log 452, and/or a threat-assessment condition 454. Note the cryptographic keys 434 may include key A 436-1 and/or key B 436-2. In some embodiments, internal module 440 is included in database 430.

IDS module 444 may detect an ongoing attack based, at least in part, on information in database log 450 and/or system log 452, and may accordingly modify threat-assessment condition 454. Based on a change in the threat-assessment condition 454, one or more of the response modules 438 may perform operations to stop the ongoing attack, including: database 430 may no long process requests for information; encryption module 432 may no long decrypt requested data from the database 430; and/or cryptographic keys 434 may be encrypted or, if needed, destroyed. Moreover, IDS module 444 may instruct communication module 428 to notify an administrator of computer system 400 that the threat-assessment condition 454 has been modified and/or that preventive action(s) have been taken.

Instructions in the various modules in the memory 424 may be implemented in a high-level procedural language, an object-oriented programming language, and/or in an assembly or machine language. The programming language may be compiled or interpreted, i.e., configurable or configured to be executed by the one or more processing units 410.

Although the computer system 400 is illustrated as having a number of discrete components, FIG. 4 is intended to provide a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include: fewer components or additional components; two or more components may be combined into a single component; and/or a position of one or more components may be changed. In some embodiments the functionality of the computer system 400 may be implemented more in hardware and less in software, or less in hardware and more in software, as is known in the art.

Figure 5:
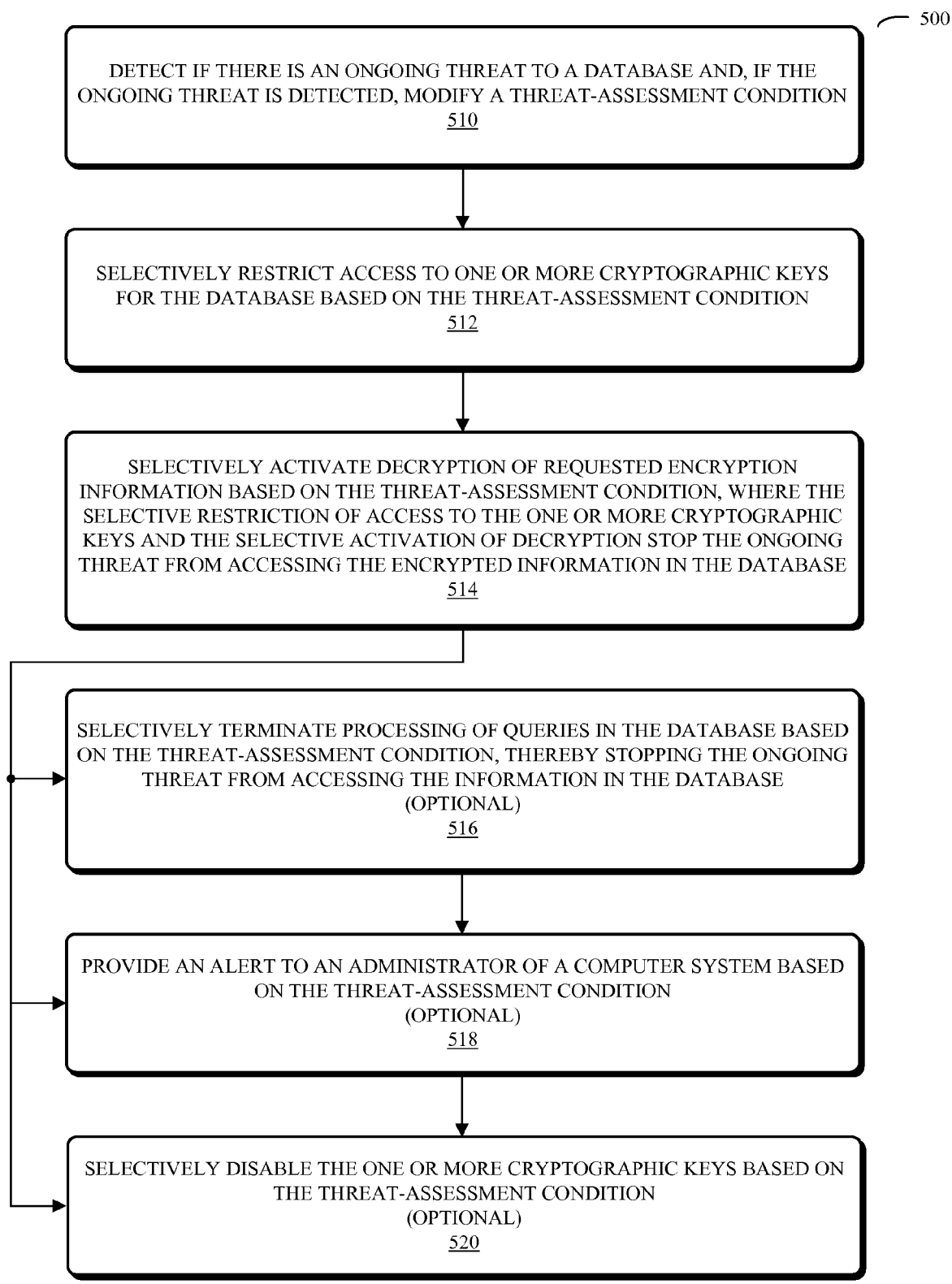
FIG. 5 is a flow chart illustrating a method for stopping an ongoing threat to a database in accordance with an embodiment of the present invention.

We now discuss methods for stopping an ongoing threat to a database. FIG. 5 presents a flow chart illustrating an embodiment of a method 500 for stopping an ongoing threat to a database. During this method, if an ongoing threat to the database is detected, a threat-assessment condition is modified (510). Then, access to one or more cryptographic keys for the database is selectively restricted based on the threat-assessment condition (512). Next, decryption of requested encrypted information is selectively activated based on the threat-assessment condition (514). Note that the selective restricting and the selective activating stop the ongoing threat from accessing the encrypted information in the database.

In some embodiments, the method 500 includes one or more optional operations, including: selectively terminate processing of queries in the database based on the threat-assessment condition, thereby stopping the ongoing threat from accessing the information in the database (516); provide an alter to an administrator of a computer system based on the threat-assessment condition (518); and/or selectively disable the one or more cryptographic keys based on the threat-assessment condition (520).

Note that in some embodiments there may be: additional or fewer operations; the order of the operations may be changed; and two or more operations may be combined into a single operation.

We now discuss data structures that may be used in database 100 (FIG. 1), system 200 (FIG. 2), computer system 300 (FIG. 3), and/or computer system 400 (FIG. 4). FIG. 6 presents a block diagram illustrating an embodiment of a data structure 600. This data structure may include multiple system log records 610. A given system-log record, such as system-log record 610-1, may include: a time stamp 612-1, a user identifier 614-1, privileges 616-1 associated with the user identifier 614-1, and/or an activity history 618-1 associated with the user identifier 614-1.

FIG. 7 presents a block diagram illustrating an embodiment of a data structure 700. This data structure may include multiple database-log records 710. A given database-log record, such as database-log record 710-1, may include multiple time stamps 712 and associated queries 714.

Note that that in some embodiments of the data structures 600 (FIG. 6) and/or 700 there may be: fewer or additional components; two or more components may be combined into a single component; and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for stopping an ongoing threat to a database, the method comprising:

detecting an ongoing threat to the database, which comprises an internal response module, wherein the internal response module collaborates with an external response module to the database;

modifying a threat-assessment condition;
selectively restricting access to one or more cryptographic keys for the database based on the threat-assessment condition by the internal response module of the database;
selectively activating decryption of requested encrypted information based on the threat-assessment condition by the internal response module of the database; and
selectively activating the external response module to take a protective action based on the threat-assessment condition.

2. The method of claim 1, wherein the decryption includes transparent data encryption.

3. The method of claim 1, wherein the decryption includes a symmetric cryptographic transformation.

4. The method of claim 1, wherein the decryption includes an asymmetric cryptographic transformation.

5. The method of claim 1, wherein the decryption includes public-key/private key decryption, and wherein the one or more cryptographic keys include one or more private keys.

6. The method of claim 1, wherein the one or more cryptographic keys are stored separately from the database, thereby providing an external control on access to at least the portion of the information in the database.

7. The method of claim 1, wherein the modification of the threat-assessment condition occurs within a pre-determined time interval after the ongoing threat is detected, and wherein the pre-determined time interval is associated with a database-access control policy and a query parsing time.

8. The method of claim 7, wherein the pre-determined time interval is less than 2 seconds.

9. The method of claim 1, further comprising selectively terminating processing of queries in the database based on the threat-assessment condition, thereby stopping the ongoing threat from accessing the information in the database.

10. The method of claim 1, further comprising providing an alert to an administrator based on the threat-assessment condition.

11. The method of claim 10, wherein the selective restriction of access to the one or more cryptographic keys and the selective activation of decryption occur prior to or concurrently with the providing of the alert.

12. The method of claim 1, wherein the detection of the ongoing threat is based on database activity.

13. The method of claim 1, wherein the detection the ongoing threat is based on a user identifier.

14. The method of claim 1, wherein the detection of the ongoing threat is based on: a pattern of information requests, a time interval during which the information requests are received, an attempt to access privileged information in the database, or an attempt to access sensitive information in the database.

15. The method of claim 1, wherein the threat-assessment condition is set to a given value based on a severity of the ongoing threat.

16. The method of claim 1, further comprising selectively disabling the one or more cryptographic keys based on the threat-assessment condition.

17. The method of claim 16, wherein the selective disabling involves encrypting the one or more cryptographic keys.

18. The method of claim 16, wherein the selective disabling involves erasing the one or more cryptographic keys.

19. A non-transitory computer-readable storage medium storing instructions that when executed by a computer cause the computer to perform a method for stopping an ongoing threat to a database, the method comprising:
detecting an ongoing threat to the database, which comprises an internal response module, wherein the internal response module collaborates with an external response module to the database;
modifying a threat-assessment condition;
selectively restricting access to one or more cryptographic keys for the database based on the threat-assessment condition by the internal response module of the database;
selectively activating decryption of requested encrypted information based on the threat-assessment condition by the internal response module of the database; and
selectively activating the external response module to take a protective action based on the threat-assessment condition.

20. The non-transitory computer-readable storage medium of claim 19, wherein the method further comprises selectively terminating processing of queries in the database based on the threat-assessment condition, thereby stopping the ongoing threat from accessing the information in the database.

21. The non-transitory computer-readable storage medium of claim 19, wherein the method further comprises providing an alert to an administrator based on the threat-assessment condition.

22. The non-transitory computer-readable storage medium of claim 21, wherein the selective restriction of access to the one or more cryptographic keys and the selective activation of decryption occur prior to or concurrently with the providing of the alert.

23. The non-transitory computer-readable storage medium of claim 19, wherein the threat-assessment condition is set to a given value based on a severity of the ongoing threat.

24. The non-transitory computer-readable storage medium of claim 19, wherein the method further comprises selectively disabling the one or more cryptographic keys based on the threat-assessment condition.

25. A computer system, comprising:
a processor;
a memory that stores a database, which comprises an internal response module that collaborates with an external response module to the database, and one or more cryptographic keys for encrypting information in the database, wherein the internal response module restricts access to the cryptographic keys based on a threat-assessment condition and activates decryption of requested encrypted information based on the threat-assessment condition; one or more cryptographic keys based on a threat assessment condition;
a data-encryption device that encrypts at least the portion of the information prior to storing this information in the database and decrypts a subset of at least the portion of the information when a query associated with the subset is received; and
a control logic that detects an ongoing threat to the database and modifies the threat-assessment condition.

* * * * *

UNITED STATES PATENT AND TRADEMARK OFFICE
CERTIFICATE OF CORRECTION

PATENT NO. : 7,895,452 B2  
APPLICATION NO. : 11/773688  
DATED : February 22, 2011  
INVENTOR(S) : Mir et al.

Page 1 of 1

It is certified that error appears in the above-identified patent and that said Letters Patent is hereby corrected as shown below:

In Drawings

In sheet 3 of 6, in figure 3, box No. 334, line 1, delete "ADMINSITRATOR" and insert -- ADMINISTRATOR --, therefor.

In sheet 6 of 6, in figure 6, box no. 616-1, line 1, delete "PRIVALEDGES" and insert -- PRIVILEGES --, therefor.

In column 9, line 19, in Claim 5, delete "private key" and insert -- private-key --, therefor.

In column 9, line 46, in Claim 13, after "detection" insert -- of --.

In column 10, line 53-54, in Claim 25, after "condition;" delete "one or more cryptographic keys based on a threat assessment condition;".

Signed and Sealed this  
Fourth Day of October, 2011

David J. Kappos  
*Director of the United States Patent and Trademark Office*